United States Patent
Englund et al.

(10) Patent No.: US 8,155,687 B2
(45) Date of Patent: Apr. 10, 2012

(54) DYNAMIC ADJUSTMENT OF POWER OFFSET FOR UE/BS BASED ON ERROR EVENT OF NACK TO ACK

(75) Inventors: Eva Englund, Linkoping (SE); Xinyu Gu, Beijing (CN); Ke Wang Helmersson, Linkoping (SE); Qingyu Miao, Beijing (CN)

(73) Assignee: Telefonaktiebolaget L M Ericsson (publ) (SE)

( * ) Notice: Subject to any disclaimer, the term of this patent is extended or adjusted under 35 U.S.C. 154(b) by 416 days.

(21) Appl. No.: 12/513,652

(22) PCT Filed: Nov. 6, 2006

(86) PCT No.: PCT/SE2006/050456
§ 371 (c)(1),
(2), (4) Date: May 5, 2009

(87) PCT Pub. No.: WO2008/057017
PCT Pub. Date: May 15, 2008

(65) Prior Publication Data
US 2010/0029322 A1 Feb. 4, 2010

(51) Int. Cl.
*H04B 7/00* (2006.01)
(52) U.S. Cl. ............ 455/522; 370/343; 455/69; 455/517
(58) Field of Classification Search .................. 455/522, 455/69, 517; 370/343
See application file for complete search history.

(56) References Cited

U.S. PATENT DOCUMENTS

2005/0032536 A1* 2/2005 Wei et al. ............... 455/517
2008/0039022 A1* 2/2008 Wei et al. ............... 455/69

FOREIGN PATENT DOCUMENTS

| CN | 1411182 A | 4/2003 |
| WO | WO 02/080403 A1 | 10/2002 |
| WO | WO 2005/022883 A2 | 3/2005 |
| WO | WO 2006/101347 A1 | 9/2006 |
| WO | WO 2007/064266 A1 | 6/2007 |

OTHER PUBLICATIONS

International Search Report and Written Opinion dated Aug. 29, 2007 (11 pages).

* cited by examiner

*Primary Examiner* — Lam T Mai
(74) *Attorney, Agent, or Firm* — Myers Bigel Sibley & Sajovec, P.A.

(57) ABSTRACT

A radio network system employing a method with dynamic adjustment of the power offset that provides a "per-UE"-NACK to ACK power offset calculation method instead of using a fixed offset for all users in the cell is disclosed. Also for each UE, the power offset can adjusted dynamically. The adjustment is based on the error event of NACK to ACK. When an error event of NACK to ACK happens, the offset is increased, otherwise the offset is decreased. Hence, the offset can be controlled for each User Equipment for the duration of a call starting from some standard configured value is calculated and used rather than a fixed offset.

19 Claims, 3 Drawing Sheets

DYNAMIC ADJUSTMENT OF POWER OFFSET FOR UE/BS BASED ON ERROR EVENT OF NACK TO ACK

TECHNICAL FIELD

The present invention relates to a method and a device for transmitting control messages in a radio network, in particular a WCDMA system.

BACKGROUND

Today a number of different standards for telecommunication exist. One such existing telecommunication standard is Code Division Multiple Access (CDMA) another standard is termed Wideband Code Division Multiple Access (WCDMA).

In a WCDMA system, which is a powerful standard able to transmit data over a radio network at very high speed, a User Equipment (UE) such as a mobile telephone communicates over radio channels with base stations typically denoted Node B. Each base station usually transmits and receives signals over selected radio channels for a particular geographic region known as a cell. The cell can in turn be subdivided into several sectors. Typically, a number of base stations are connected to a base station controller node a radio network controller node (RNC). One or more RNCs are, in turn, connected to or included with a mobile switching center (MSC). The mobile switching center is usually connected, e.g., via a gateway, to other telecommunication networks, such as the public switched telephone network or to a packet-data network such as the Internet.

In a wideband code division multiple access (WCDMA) mobile telecommunications system, the information transmitted between a base station and a particular mobile station is modulated by a mathematical code (such as spreading code) to distinguish it from information for other mobile stations which are utilizing the same radio frequency. Thus, in WCDMA each mobile radio employs its own unique code sequence to encode its data signal. The receiver, knowing the code sequences of the mobile radio it services, decodes the received signal to recover data from each radio.

The WCDMA encoding process enlarges the spectrum of the signal and is therefore known as spread-spectrum modulation. In WCDMA the bandwidth of the transmitted signal can be very wide indeed. The resulting signal is also called a spread-spectrum signal. The spectral spreading of the transmitted signal gives to WCDMA its multiple access capability. That is, if multiple radios transmit a spread-spectrum signal at the same time, the receiving station will still be able to distinguish between the radios because each user has a unique code that has a sufficiently low cross-correlation with other codes used simultaneously by other radios.

Correlating the received signal with a code signal from a certain radio despreads the signal from that radio, while the other spread-spectrum signals will remain spread over a large bandwidth. Thus, after decoding a signal from a particular radio within the information bandwidth, the power of the desired radio signal will be larger than the interfering power of the other radios. With that power discrepancy, the desired signal can be extracted.

In a WCDMA system, power control is very important. In the uplink direction, the requirement for power control arises because of the possibility for multiple access interference. All radios in a cell using a WCDMA system transmit their data using the same bandwidth at the same time as other radios in that cell. Further, in a WCDMA system the neighboring cell frequencies are the same as in a given cell. Thus, interference can be seen into neighboring cells, causing capacity degradation. In such a system, it is inevitable that radios will interfere with one another. Signals received by the base station from a radio close to the base stations, for example, will be stronger than signals received from radios located at a cell boundary. Distant radios will thus tend to be dominated by close ones.

Depending on the circumstances the system from time to time may employ different handover techniques, such as soft and hard handovers. In soft handover a mobile station is connected to more than one base station simultaneously.

In WCDMA mobile communications, typically the same base band signal with suitable spreading is sent from several base stations with overlapping coverage. The mobile terminal can thus receive and use signals from several base stations simultaneously. Moreover, since the radio environment changes rapidly, a mobile station likely has radio channels to several base stations at the same moment, e.g., so that the mobile station can select the best channel and, if necessary, use signals directed to the mobile from various base stations in order to keep radio interference low and capacity high.

A general problem in most radio network systems including WCDMA is, as mentioned above, the existence of noise and interference. The presence of noise and interference will cause a number of unwanted events to occur. For example, the level of noise and interference will determine the power level required for transmitting data in a radio network. If the level of noise and interference is high the data transmission will require more power in order to be distinguishable over the background noise.

Also, a high power level for transmitting data and other signaling will in itself generate a raise in the overall level of noise and interference in the radio network, which of course is undesired.

In addition, the transmission power should be kept at a minimum to minimize power consumption. This is particularly important if the transmitting device is mobile and includes a battery that has to be recharged. A high power level will discharge batteries much more quickly.

The above applies both to CDMA systems as well as WCDMA systems.

SUMMARY

It is an object of the present invention to overcome or at least reduce some of the problems associated with existing radio networks, in particular WCDMA radio networks.

It is another object of the present invention to reduce the noise and interference in a WCDMA radio network.

It is yet another object of the present invention to provide a WCDMA system having improved power control characteristics.

These object and others are obtained with a base station in a radio network employing a method with dynamic adjustment of the power offset that provides a "per-UE" NACK to ACK power offset calculation method instead of using a fixed offset for all users in the cell. Also, for each UE, the power offset is adjusted dynamically. The adjustment is based on the error event of NACK to ACK. When an error event of NACK to ACK happens, the offset is increased, otherwise the offset is decreased. Hence, the offset can be controlled for each User Equipment for the duration of a call starting from some standard configured value is calculated and used rather than a fixed offset.

The power adjustment algorithm adjusting the offset can for example be implemented in a unit located in a base station or it might be located in each UE.

BRIEF DESCRIPTION OF THE DRAWINGS

The present invention will now be described in more detail by way of non-limiting examples and with reference to the accompanying drawings, in which.

DETAILED DESCRIPTION

Figure 1:
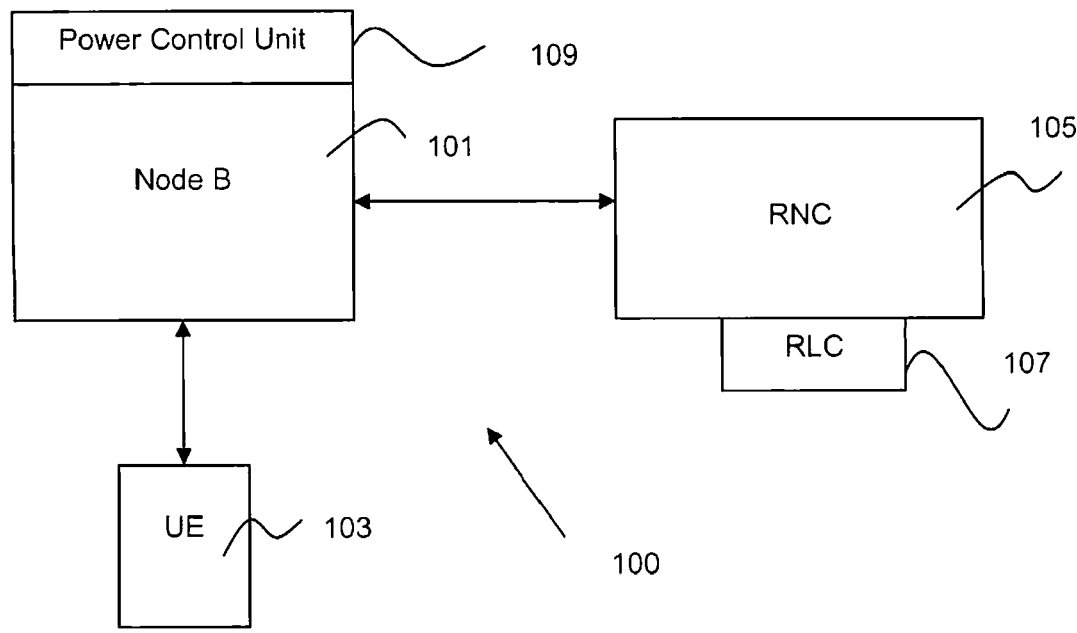
FIG. 1 is a general view of a WCDMA system

In FIG. 1, a general view of a WCDMA system 100 is depicted. The system 100 comprises a base station (Node B) 101. The base station 101 serves a number of mobile terminals, usually termed User Equipment (UE) 103, located within the area covered by the base station 101. The base station 101 is also connected to a radio network controller node (RNC) 105. The RNC 105 typically also includes a Radio link controller node (RLC) 107. The RLC 107 is among other things responsible for detecting errors. The system 100 also comprises a power control unit 109, which preferably is co-located or an integral part of the base station 101.

In release 6, the WCDMA specifications are extended with a new uplink transport channel, the Enhanced Dedicated Channel (E-DCH). The enhanced uplink (EUL) is a natural complement to High Speed Downlink Packet Access (HS-DPA) for high-performance packet-data applications.

Three downlink channels are needed to support the EUL transmission: E-DCH Absolute Grant Channel (E-AGCH), E-DCH Relative Grant Channel (E-RGCH), and E-DCH Hybrid ARQ Indication Channel (E-HICH).

The E-HICH is a dedicated channel, carrying the binary Hybrid Automatic Repeat Request (HARQ) acknowledgements between the Node B 101 and each UE 103. The Node B transmits acknowledgement messages, either ACK or NACK, depending on whether the decoding of the transport block was successful or a retransmission is requested. If no transmission is detected, DTX is used on the E-HICH.

If the UE is in soft handover several Node B 101 will be involved in the reception of uplink transmissions. In this case one of the cells, typically the cell with the best down link DL, is appointed the "serving cell". Both the serving cell and the non-serving cells in the E-DCH active set will send the hybrid ARQ acknowledgement to the UE separately. The serving cell transmits either ACK or NACK mapped to different constellation points using binary phase-shift keying (BPSK), whereas the non-serving cells transmit only ACKs (ON/OFF keying). In the non-serving cells there is no difference made between DTX and NACK, so if the node B fails to decode the E-DCH Dedicated Physical Control Channel (FDD only), abbreviated E-DPCCH, i.e., if the transmission is missed nothing is transmitted.

Figure 2:
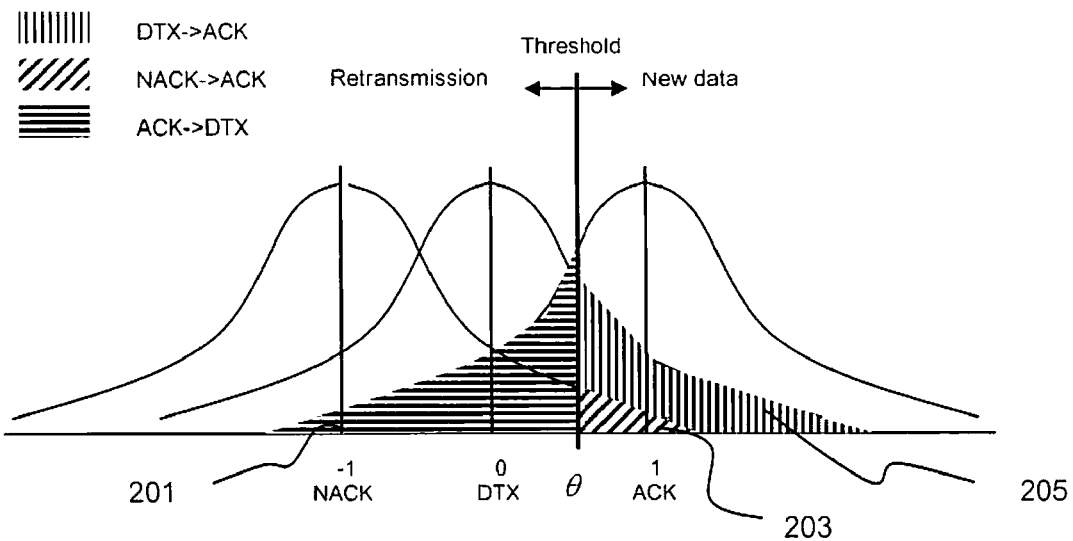
FIG. 2 is a diagram illustrating different signal detection levels in the E-HICH channel.

Due to the noise and interference in the channel, the HARQ acknowledgements transmitted by the Node B may have different interpretation by the UE. For example, an ACK sent by the Node B could be interpreted as NACK by the UE when the received signal is lower than the detection threshold. In that case, the UE would retransmit the data unnecessarily as long as the transmission attempts do not exceed the maximum limit. The probability of such an error event is shown in FIG. 2 at 201. In another case, a NACK or DTX sent by the Node B is interpreted as an ACK by the UE because the decision value is larger than the threshold. In that case, the UE would send a new data instead of retransmission. This will result in a RLC-retransmission. The probability of these error events are shown in FIG. 2 at 203 and 205 depending on DTX or NACK has been sent by the Node B.

The probabilities of error events can be expressed by a Q function, which is described below. Let $E_m$ be the message energy of E-HICH, $\theta$ be the detection threshold, and $\sigma^2$ be the variance of noise plus interference.

The probability that a decision value is larger than the detection threshold when a DTX is sent by the Node B is:

$$P_{DTX \to ACK} = Q\left(\frac{\theta}{\sigma}\right) \qquad (1)$$

Using function (1) the value, $$\frac{\theta}{\sigma}$$

can be determined according to the desired $P_{DTX \to ACK}$. If for example, in the serving cell, $P_{DTX \to ACK}$ is 1%, then $$\frac{\theta}{\sigma} = 2.33.$$

If in the non-serving cell, $P_{DTX \to ACK}$ is 0.1%, then $$\frac{\theta}{\sigma} = 3.09.$$

Also, the probability that the decision value is larger than the detection threshold when a NACK is sent by the Node B is:

$$P_{NACK \to ACK} = Q\left(\frac{\sqrt{E_m}}{\sigma} + \frac{\theta}{\sigma}\right) \qquad (2)$$

And the probability that the decision value is lower than the detection threshold when an ACK is sent by the Node B is:

$$P_{ACK \to DTX} = Q\left(\frac{\sqrt{E_m}}{\sigma} - \frac{\theta}{\sigma}\right) \qquad (3)$$

Considering a serving cell, for the calculated $$\frac{\theta}{\sigma} = (2.33),$$

from (3) and to achieve 1% in $P_{ACK \rightarrow DTX}$, $$\frac{\sqrt{E_m}}{\sigma}$$

should be 4.66. And from (2), it is clear that for the same $$\frac{\theta}{\sigma},$$

only with a fairly small value of $E_m$, $P_{NACK \rightarrow ACK}$ could be lower than 1%. That is to say, the Node B needs less power to send NACK than to send ACK to achieve the desired detection performance.

Currently in existing solutions, a power offset is used in the product to set different power for NACK and ACK. The configured power offset value applies to all users in the cell.

$$\text{Power}_{NACK} = \text{Power}_{ACK} + \text{offset} \quad (4)$$

The default value of the offset is typically −10 dB in existing solutions. If the offset is set too high, power will be wasted, and if the offset is set too low, it is hard to guarantee the detection performance for NACK to ACK.

A dynamic adjustment algorithm as described herein is based on the detection of the error event (NACK→ACK) at the Node B. To detect the error event, the RSN (Retransmission Sequence Number) can be used. The RSN is transmitted on E-DPCCH to indicate whether the current transmission is a retransmission or a new transmission. If it is a new transmission, the RSN will be set to 0, and if it is a retransmission, the RSN value will be incremented by 1.

If a base station has transmitted a NACK, the mobile terminal should respond with a retransmission of the previous data in that HARQ process but not a new transmission. However, if the mobile terminal instead responds with a new transmission, there is a signaling error. One possible error can be that the NACK transmitted by the base station is misinterpreted as an ACK by the mobile terminal. This gives an indication that the power for transmitting NACK is too low and need to be increased. That is, the power offset between NACK and ACK should be increased.

The power offset adjustment algorithm can be operated by means of a so-called "jump algorithm": that is, each occurrence of the error event triggers an increase of E-HICH power with a predefined step up to the maximum power offset otherwise the power is decreased by the same or a smaller step. In particular step up to the maximum power offset can be set to be much larger in relation to each step decreasing the power offset.

Figure 3A:
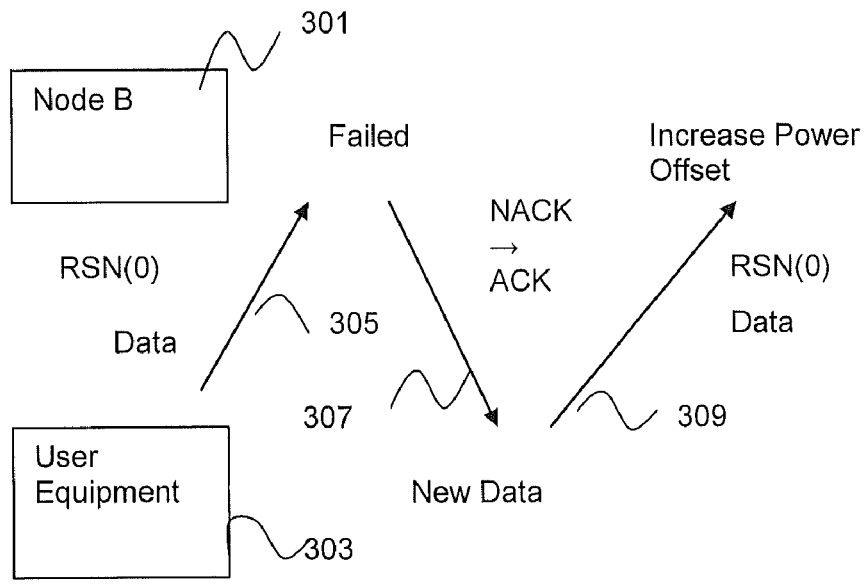
FIGS. 3a and 3b illustrate different scenarios including transmission of ACK and NACK messages in a WCDMA system.
Figure 3B:
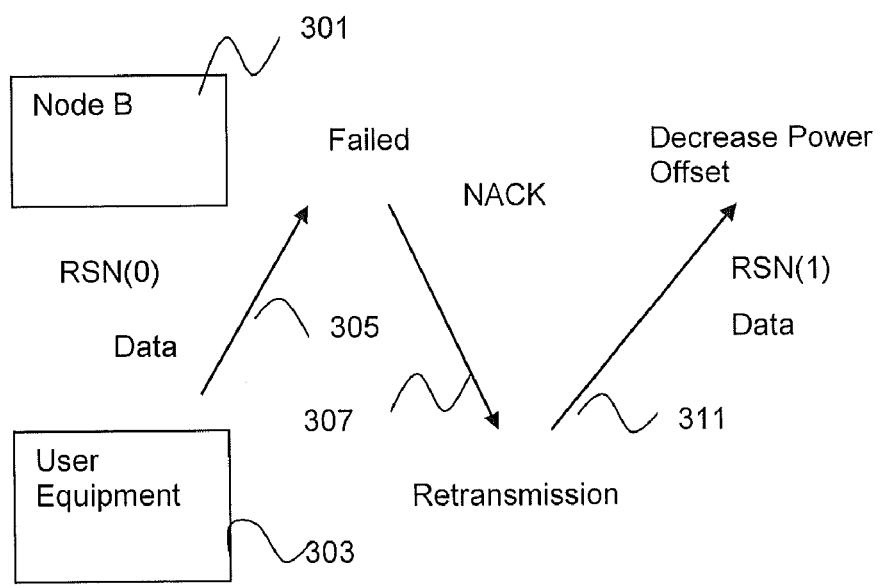

In FIGS. 3a and 3b the: dynamic power adjustment method based on detection error events is shown in more detail. Thus, in accordance with FIG. 3a if Node b 301 receives a first data transmission 305 from the UE 303, which the Node B cannot decode correctly, the Node B 301 will reply with a negative acknowledgment message NACK 307. If the negative acknowledgment message NACK 307 is received as an ACK the UE 303 will transmit new data in a message 309. However, the Node B 301 will based on the retransmission sequence number RSN detect that the NACK must have been received incorrectly and will in response to that take action and increase the power offset for NACK messages.

If on the other hand the message 307 is decoded correctly, as depicted in FIG. 3b, the Node B 301 will decrease the NACK power offset in order to reduce power consumption and overall noise level in the system.

Figure 4:
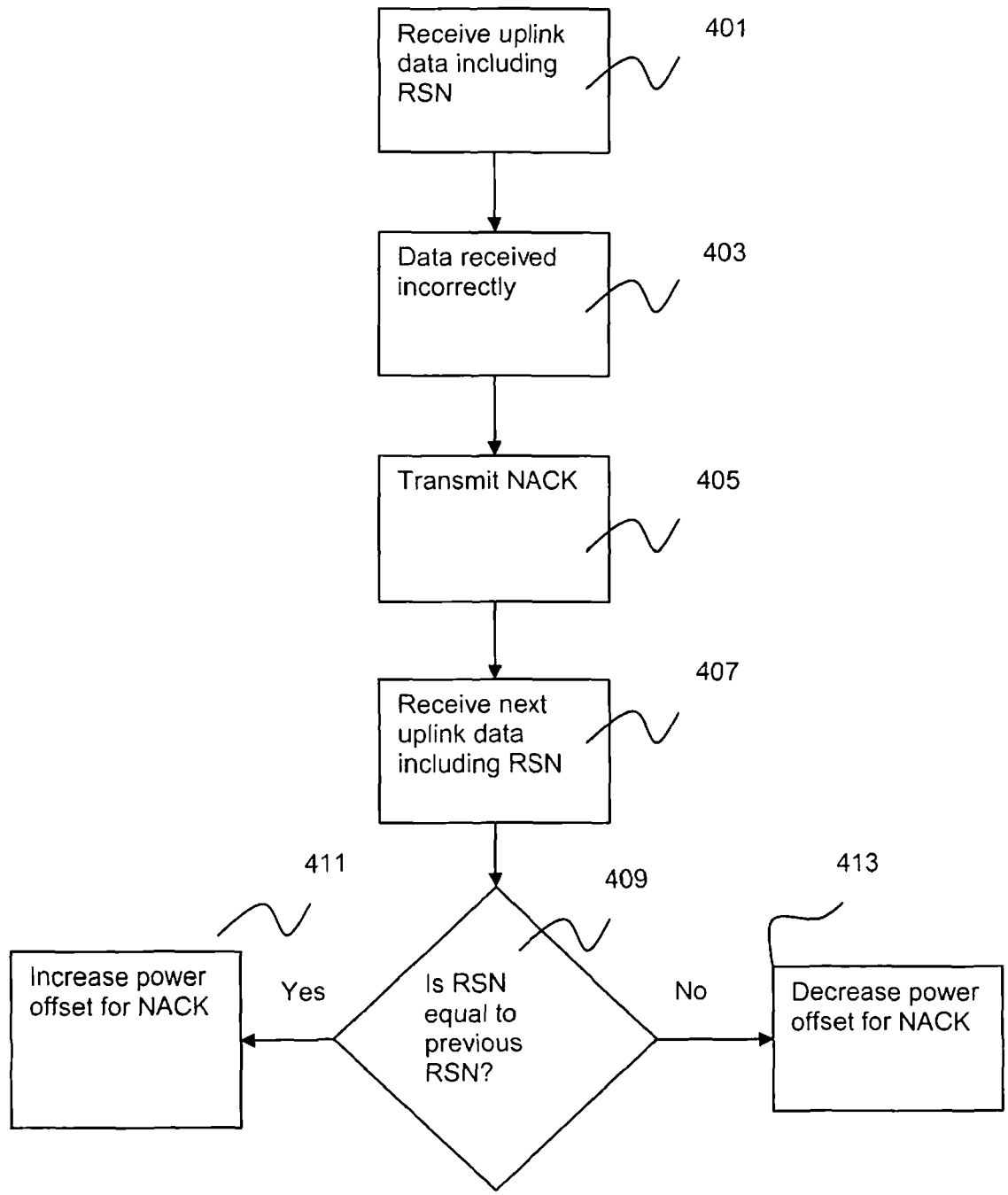
FIG. 4 is a flow chart illustrating different steps performed when transmitting and receiving ACK and NACK messages in a WCDMA system

In FIG. 4 a flowchart illustrating different steps preformed in a unit, such as the unit 109, for controlling power in a WCDMA system as described herein is shown. First, in a step 401, the unit receives a data message from a mobile terminal including a RSN. Next in a step 403 the unit determines that the message cannot be decoded correctly. Thereupon, in a step 405, the unit transmits a negative acknowledgement message NACK as a response to the data message received in step 401.

Next, in a step 407, a new data message including an RSN is received. The unit then, in a step 409 compares the RSN numbers received in step 401 and 407. If the RSN numbers in steps 401 and 407 are equal, the unit increases the power offset for NACK messages in a step 411. If on the other hand the RSN numbers received in steps 401 and 407 are not equal the unit decreases the power offset for NACK messages in a step 413.

When a UE is in soft handover (SHO), it can be difficult for Node B to know whether the new transmission is due to the signal error on E-HICH in the serving cell or due to the macro diversity that the UE receives an ACK from non-serving cells. However, the same algorithm can still be used by assuming that the new transmission is due to the signal error on E-HICH in SHO scenario, since the probability that a non-serving cell sends ACK is relatively low. But the up/down step could be set to a lower value since it is in most cases known if the link is in SHO or not.

The method and system as described hereinabove may also be employed in other types of signaling where there is a need or desire to dynamically adjust the power offset. For example, it may also be used for adjusting the High Speed Dedicated Physical Control Channel HS-DPCCH power for transmitting ACK/NACK in uplink in response to downlink data and other similar situations both in uplink transmission as well as downlink transmission. Hence, the power adjustment unit as described herein may be located both in the base station as well as in a mobile station.

By using the system and method as described herein, the power offset between NACK and ACK can be adjusted dynamically by a unit in the base station or in a mobile station to a power level that is needed for NACK. In this way, it is possible to obtain a high detection performance for NACK to ACK, which when it occurs will cause RLC retransmission and influence the end-user performance. Furthermore, in the case when the power for ACK can not be adjusted correctly by the power control methods, the method as described herein can compensate the power offset effectively so that the detection performance for NACK is still ensured.

The invention claimed is:

1. A method of transmitting acknowledgement signals in a radio network system comprising a base station communicating with a number of mobile terminals, the method comprising:

at a transmitting end, transmitting an acknowledgment message as a response to a data message received,
  in the case when the acknowledgment message sent is a negative acknowledgement (NACK), detecting if the acknowledgement message was correctly received, and
  at the transmitting end, adjusting the power for transmitting NACK messages based on whether the acknowledgement message was correctly received,
  where the detection of a correctly received NACK message is based on a comparison of Retransmission Sequence Numbers (RSN).

2. The method of claim 1, where the power for transmitting the NACK messages is increased upon detection that the NACK message has been received as an acknowledgement (ACK) message.

3. The method of claim 1, where the power for transmitting the NACK messages is decreased upon detection that the NACK message has been received correctly.

4. The method of claim 1, where the radio network system is a wideband code division multiple access (WCDMA) system.

5. A method of transmitting acknowledgement signals in a radio network system comprising a base station communicating with a number of mobile terminals, the method comprising:
at a transmitting end, transmitting an acknowledgment message as a response to a data message received,
in the case when the acknowledgment message sent is a negative acknowledgement (NACK), detecting if the acknowledgement message was correctly received, and
at the transmitting end, adjusting the power for transmitting NACK messages based on whether the acknowledgement message was correctly received;
where adjusting the power for transmitting NACK messages comprises increasing and/or decreasing the power and where each time the power for transmitting NACK messages is increased that increment is significantly larger than each time the power for transmitting NACK messages is decreased.

6. A method of transmitting acknowledgement signals in a radio network system comprising a base station communicating with a number of mobile terminals, the method comprising:
at a transmitting end, transmitting an acknowledgment message as a response to a data message received,
in the case when the acknowledgment message sent is a negative acknowledgement (NACK), detecting if the acknowledgement message was correctly received, and
at the transmitting end, adjusting the power for transmitting NACK messages based on whether the acknowledgement message was correctly received;
where the transmitting end corresponds to the base station; and
where the acknowledgement messages from the base station to the mobile terminals are transmitted on an E-DCH Hybrid ARQ Indication Channel (E-HICH).

7. A radio network system comprising a channel for transmitting acknowledgement signals between a base station and a number of mobile terminals, the system comprising:
means for transmitting an acknowledgment message from a transmitting end in response to receipt of data message,
means for detecting if a negative acknowledgement (NACK) message is correctly received based on a comparison of Retransmission Sequence Numbers (RSN), and
means for adjusting the power for transmitting NACK messages in response to if the detection was correct or not.

8. The system of claim 7, further comprising:
means for increasing the power for transmitting NACK messages upon detection that a NACK message has been received as an acknowledgement (ACK) message.

9. The system of claim 7, further comprising:
means for decreasing the power for transmitting the NACK messages upon detection that a NACK message has been received correctly.

10. The system of claim 7, where the radio network system is a wideband code division multiple access (WCDMA) system.

11. A radio network system comprising a channel for transmitting acknowledgement signals between a base station and a number of mobile terminals, the system comprising:
means for transmitting an acknowledgment message from a transmitting end in response to receipt of data message;
means for detecting if a negative acknowledgement (NACK) message is correctly received; and
means for adjusting the power for transmitting NACK messages in response to if the detection was correct or not, where the means for adjusting the power for transmitting NACK messages further comprises:
means for setting an increment each time the power for transmitting the NACK messages is increased significantly larger than each time the power for power for transmitting the NACK messages is decreased.

12. A radio network system comprising a channel for transmitting acknowledgement signals between a base station and a number of mobile terminals, the system comprising:
means for transmitting an acknowledgment message from a transmitting end in response to receipt of data message, where the transmitting end corresponds to the base station, and where the acknowledgement messages from the base station to a mobile terminal are transmitted on an E-DCH Hybrid ARQ Indication Channel (E-HICH);
means for detecting if a negative acknowledgement (NACK) message is correctly received; and
means for adjusting the power for transmitting NACK messages in response to if the detection was correct or not.

13. A unit for use in a radio network system, the system comprising a channel for transmitting acknowledgement signals between a base station and a number of mobile terminals, the unit comprising:
a module for transmitting an acknowledgment message as a response to a data message received,
a detection module for detecting if a negative acknowledgement NACK message is correctly received, where the detection module is set to detect if a NACK message has been received correctly based on a comparison of Retransmission Sequence Numbers (RSN), and
a power adjustment module for adjusting the power for transmitting NACK messages in response to if the detection was correct or not.

14. The unit of claim 13, where the power adjustment module is set to increase the power for transmitting NACK messages upon detection that a NACK message has been received as an acknowledgement (ACK) message.

15. The unit of claim 13, where the power adjustment module is set to decrease the power for transmitting NACK messages upon detection that a NACK message has been received correctly.

16. The unit of claim 13, where the unit is adapted to be used in a wideband code division multiple access (WCDMA) system.

17. The unit of claim 13, where the unit is adapted to be located in a base station.

18. The unit of claim 17, where the unit is set to transmit acknowledgement messages on an E-DCH Hybrid ARQ Indication Channel (E-HICH).

19. A unit for use in a radio network system, the system comprising a channel for transmitting acknowledgement signals between a base station and a number of mobile terminals, the unit comprising:
a module for transmitting an acknowledgment message as a response to a data message received,
a detection module for detecting if a negative acknowledgement NACK message is correctly received, and a power adjustment module for adjusting the power for transmitting NACK messages in response to if the detection was correct or not, where the power adjustment module is set to increment the power for transmitting NACK messages with an increment each time the NACK acknowledge message power is increased, said increment being significantly larger than each time the NACK acknowledge message power is decreased.

* * * * *

UNITED STATES PATENT AND TRADEMARK OFFICE
CERTIFICATE OF CORRECTION

| | |
|---|---|
| PATENT NO. | : 8,155,687 B2 |
| APPLICATION NO. | : 12/513652 |
| DATED | : April 10, 2012 |
| INVENTOR(S) | : Englund et al. |

It is certified that error appears in the above-identified patent and that said Letters Patent is hereby corrected as shown below:

On the Face Page, in Field (75), under "Inventors", in Column 1, Line 1, delete "Linkoping" and insert -- Linköping --, therefor.

On the Face Page, in Field (75), under "Inventors", in Column 1, Line 3, delete "Linkoping" and insert -- Linköping --, therefor.

On the Face Page, in Field (73), under "Assignee", in Column 1, Line 2, delete "(publ)" and insert -- (publ), Stockholm, --, therefor.

In Column 3, Line 10, delete "system" and insert -- system, --, therefor.

Signed and Sealed this
Thirty-first Day of July, 2012

David J. Kappos
*Director of the United States Patent and Trademark Office*